May 18, 1954     W. E. GLENN, JR     2,678,773

MECHANICAL REGISTER

Filed Feb. 7, 1951

INVENTOR.
WILLIAM E. GLENN, JR.

BY

Roland A. Anderson

ATTORNEY

Patented May 18, 1954

2,678,773

UNITED STATES PATENT OFFICE 2,678,773

MECHANICAL REGISTER

William E. Glenn, Jr., Berkeley, Calif., assignor to the United States of America as represented by the United States Atomic Energy Commission Application February 7, 1951, Serial No. 209,773

2 Claims. (Cl. 235—92)

This invention relates to a counting device and more particularly to a counter having a magnetic rotor disposed between the poles of one magnet in cooperating relation with another magnet and indicating means for determining the angular disposition of said rotor.

Mechanical registers of the pawl and ratchet type have found extensive use as digital counters. However, mechanical counters of this type are limited in speed of response to about 1000 counts per minute. With the development of faster electronic counting circuits, it has been found desirable to use faster registers and reduce the need for electronic scalers in counting circuits.

In order to register pulses at a high rate, the present invention utilizes a magnetic disc rotor of low mass supported on a shaft which is journaled in low friction bearings at the ends thereof. Indicating means is provided to determine the angular movement of the rotor which is positioned between the pole tips of a permanent magnet and also those of an electromagnet. This low-friction and low-inertia mechanism overcomes many of the disadvantages of existing mechanical registers.

It is, therefore, an object of this invention to provide a new and improved mechanical register.

Another object of this invention is to provide a register which will count many times faster than existing mechanical registers.

Still another object of this invention is to provide a register with a minimum of moving parts to reduce the maintenance and improve the reliability thereof.

Still another object of the present invention is to translate electrical pulses into rotative motion and to provide means for registering such motion.

Still another object of this invention is to provide a mechanical register with a magnetically permeable rotor, a permanent magnet and an electromagnet so arranged that pulses on the electromagnet are recorded by rotative motion of the rotor.

Other objects and advantages of the invention will be apparent from the following description and claims considered together with the accompanying drawing, in which:

Figures 1, 2:
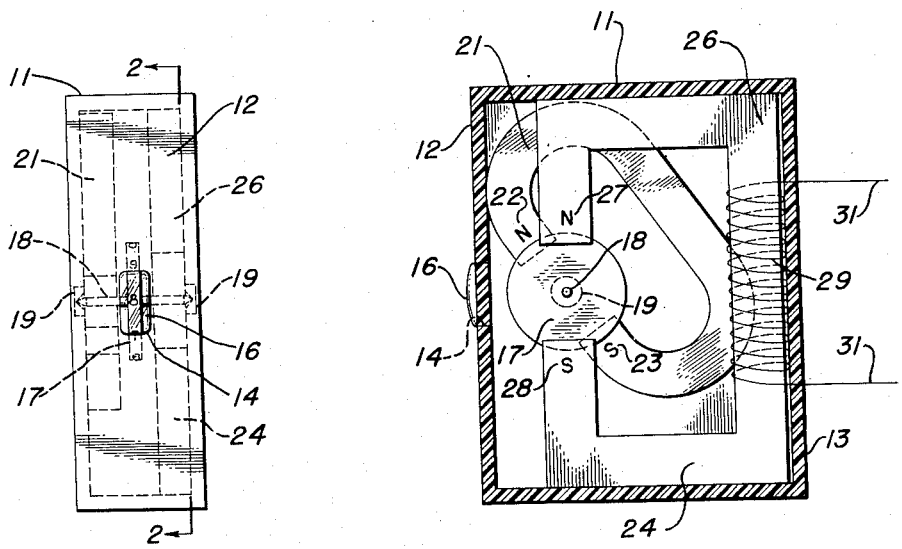
Figure 1 is an elevational view of the device.
Fig. 2 is a sectional view of the register as indicated by the line 2—2 in Fig. 1.

Referring to the drawing, and to Fig. 2 in particular, there is provided a housing 11 of suitable material such as phenolic resin or molded rubber. In a preferred embodiment of the invention, the housing 11 has a top wall 12 and a bottom wall 13 spaced apart by a rectangular enclosure of the customary four side walls. In the top wall 12 is provided an aperture 14 within which is disposed a transparent window 16 of suitable material, such as plastic or glass. Within housing 11 there is disposed a cylindrical rotor or disc 17 composed of a magnetic material having a high permeability and low residual magnetism. The rotor 17 is centrally supported on its axis by a shaft 18 projecting from each opposite surface thereof and which is suitably journaled at each end in a low friction bearing 19 mounted one in each of the opposing side walls of the housing 11. Such mounting of the rotor 17 positions the edge thereof so that it is visible from the outside of the housing 11 through the window 16. To provide a means for determining the movement of the rotor 17 a series of numerals, 0 to 9, is inscribed thereon in equally spaced relation about the periphery thereof.

To provide a constant diametrical magnetizing force on the rotor 17, a magnet 21 which may be of the ring-shaped permanent type having a north pole 22 and a south pole 23 opposing each other with the gap therebetween spanning the rotor 17 is suitably mounted within the housing 11 and against one of the side walls thereof. Also disposed within the housing 11 is a substantially ring-shaped core 24 of an electromagnet 26 having a north pole 27 and a south pole 28 opposing each other with the gap therebetween spanning the rotor 17.

An energizing coil 29 encircles the central leg of the core 24 of the electromagnet 26. The coil 29 has a suitable number of turns and suitable current carrying capacity to ensure that the electromagnet 26, when energized, provides a magnetic field across its pole tips which is somewhat stronger than the magnetic field across the pole tips of the permanent magnet 21. Connected to each end of the energizing coil 29 is an electrical lead 31 extending from the interior of the housing 11 through the bottom wall 13 to the exterior of the housing. Since the housing 11 is described as being fabricated of phenolic resin or molded rubber it is not necessary to insulate leads 31 from the housing. If the housing 11 were fabricated of metal suitable insulating sleeves would be provided where the wires 31 pass through the wall 13 of the housing.

The function of the electromagnet 26 is to provide a pulsed magnetizing force on the rotor 17 in response to pulses originating at a source connected to leads 31. As shown in Fig. 2, permanent magnet 21 is so located that the axis of the poles thereof is angularly displaced about the periphery of the rotor 17 from the axis of the poles of the electromagnet 26 by an angle equal to that between consecutive numerals on the edge of said rotor 17. In the above-described embodiment of the invention the angle is 36° since there are ten equally spaced numerals dividing the periphery of the rotor 17. If there were one hundred numerals, for example, inscribed around the periphery of the rotor 17 the angle between the pole tip axes of the two magnets 21 and 26 would be 3.6 degrees. The electromagnet 26 and the permanent magnet 21 are so disposed in the housing 11 that the north pole 27 of the electromagnet is adjacent but angularly spaced from the north pole 22 of the permanent magnet; in the preferred embodiment, similar poles of the two magnets 21 and 26 are spaced apart by 36° about the axes of the rotor 17.

Now consider the operation of the invention arranged and connected in the above-described manner. A pulse is fed into the coil 29, thereby energizing the electromagnet 26, and magnetizing a diameter of the rotor 17 along the axis of the pole tips of said electromagnet. The magnetic dipole so formed across the rotor 17 is stronger than the magnetic dipole formed across a diameter of the rotor by the magnetic field of the permanent magnet 21. Therefore, as the pulse in the electromagnet 26 decays, the dipole set up in the rotor 17 thereby is greater than that existing between the poles of permanent magnet 21 and is therefore attracted toward the pole tips of the permanent magnet 21.

Since the axis of the pole tips of permanent magnet 21 is displaced by an angle of 36° from the axis of the pole tips of the electromagnet 26, the rotor 17 rotates 36° and the next higher numeral appears at the window 16. As soon as it rotates the dipole formed by the electromagnet is between the permanent magnet pole tips; and the dipole previously formed by the permanent magnet is rotated in the same direction and through an equal angle. The electromagnet dipole decays to the value of the permanent magnet dipole and the permanent magnet dipole decays to zero. At this time only one magnetic dipole, that induced by the permanent magnet 21 remains on the rotor 17 and the system is ready to accept another electrical pulse with consequent angular movement of rotor 17 for another movement of rotation. Pulsing can take place at a speed of several hundred per second, such speed being limited only by the inertia of the rotating parts and the magnetic field decay rate in the electromagnet 26 and in the rotor 17.

In view of the foregoing it is seen that a particularly advantageous means has been provided to accomplish the objects of this invention.

It will be apparent that the broad principle of this invention comprehends various arrangements, for example, by having the pole tips of the respective magnets adjacent and in the plane of the rotor, the electrical and magnetic essentials of the invention are satisfied irrespective of the relative disposition of the remainder of the magnet structure, which may for example be disposed on opposite sides of the rotor. Furthermore, means for indicating the angular position of the rotor may consist of a dial pointer fastened to the axis of the rotor and pointing to a dial which has numerals inscribed around its periphery. The counting range of the register as disclosed can be extended by providing a rotor with more numerals around its periphery and reducing the angle between the axes of each pair of magnet pole tips accordingly. To further extend the counting range by multiplying factors, for example, a plurality of said registers may be connected electronically or physically or a single register may suitably operate an associated higher order register or recorder. Also it will be readily perceived that a continuously energized electromagnet may be substituted for permanent magnet 21.

While the salient features of this invention have been described in detail with respect to one embodiment it will, of course, be apparent that numerous other modifications may be made within the spirit and scope of the invention and it is therefore not desired to limit this invention to the exact details shown except insofar as they may be defined in the following claims.

What is claimed is:

1. In a pulse-actuated magnetic register, the combination comprising a housing, a magnetically permeable, peripherally circular rotor supported on a shaft, bearings disposed in said housing for journaling said shaft, said rotor having figures inscribed around the periphery thereof, an electromagnet having the poles thereof disposed diametrically of said rotor, and a permanent magnet of less field strength and having the poles thereof disposed diametrically of said rotor, the axis of the poles of said permanent magnet being so angularly displaced with respect to the poles of said electromagnet that the greater attraction of the dipole produced across said rotor by said electromagnet for the poles of said permanent magnet than the dipole produced in said rotor by the latter poles causes rotation of said rotor, said electromagnet having the north pole thereof adjacent to the north pole of said permanent magnet and said magnets being disposed in parallel planes separate from the plane of said rotor and separate from each other.

2. A fast pulse-actuated register comprising a light weight magnetically permeable but relatively non-retentive circular disc rotor supported on a shaft, means for journaling said shaft in relatively frictionless bearings, said rotor having figures inscribed on the periphery thereof, a magnifying viewing lens disposed adjacent said rotor whereby a portion of the periphery of said rotor is visible therethrough, an electromagnet having the pole tips thereof disposed diametrically of said rotor, a permanent magnet having the pole tips thereof disposed diametrically of said rotor, the axis of the pole tips of said permanent magnet angularly displaced by such an angle with respect to the axis of said electromagnet pole tips that incremental rotation of said rotor in the same direction occurs upon pulse energization of said electromagnet when the north pole of the latter is adjacent the north pole of the permanent magnet.

References Cited in the file of this patent

UNITED STATES PATENTS

| Number | Name | Date |
|---|---|---|
| 593,612 | Scribner | Nov. 16, 1897 |
| 2,156,969 | Bryce | May 2, 1939 |
| 2,165,325 | Wilkerson | July 11, 1939 |
| 2,432,600 | Werner et al. | Dec. 16, 1947 |
| 2,546,729 | De Miller | Mar. 27, 1951 |